United States Patent
Safont et al.

[11] Patent Number: 5,836,684
[45] Date of Patent: Nov. 17, 1998

[54] PROCESSING TOOL FOR USE WITH A KITCHEN APPLIANCE FOR MIXING OR COMMINUTING FOOD MATERIALS

[75] Inventors: Vicente Safont, Montgat; Mariano Peñaranda, Barcelona; Alejandro Hernandez, Santa Oliva, all of Spain; Jürgen Golob, Friedrichsdorf, Germany

[73] Assignee: Braun Aktiengesellschaft, Frankfurt, Germany

[21] Appl. No.: 820,447

[22] Filed: Mar. 12, 1997

Related U.S. Application Data

[63] Continuation of PCT/EP95/03932 Oct. 5, 1995.

[30] Foreign Application Priority Data

Oct. 10, 1994 [DE] Germany .................... 44 36 092.4

[51] Int. Cl.⁶ .................. A47J 43/044; A47J 43/07
[52] U.S. Cl. ................................................ 366/129
[58] Field of Search ..................... 366/129, 130, 366/342, 343, 331; 99/348; 416/63, 244 R

[56] References Cited

U.S. PATENT DOCUMENTS

| | | | |
|---|---|---|---|
| 3,117,769 | 1/1964 | Spingler . | |
| 3,299,924 | 1/1967 | Hanschitz | 366/129 X |
| 3,333,830 | 8/1967 | Spingler et al. | 366/129 |
| 4,850,699 | 7/1989 | Rebordosa | 366/343 X |
| 5,366,286 | 11/1994 | Ruttimann | 366/129 |
| 5,368,384 | 11/1994 | Duncan et al. | 366/129 |

FOREIGN PATENT DOCUMENTS

| | | | |
|---|---|---|---|
| A 0 529 287 | 3/1993 | European Pat. Off. . | |
| 1242817 | 6/1967 | Germany | 366/331 |
| B 12 42 817 | 6/1967 | Germany . | |
| B 12 45 058 | 7/1967 | Germany . | |
| 2213399 | 8/1989 | United Kingdom | 366/129 |

Primary Examiner—Charles E. Cooley
Attorney, Agent, or Firm—Fish & Richardson P.C.

[57] ABSTRACT

A processing tool for mixing or comminuting food materials includes a working shaft having an input end and an output end, a shaft housing which carries the input end and is adapted for coupling to a drive motor of a kitchen appliance, a flared bell-shaped housing attached to the shaft housing and positioned near the output end of the working shaft, and a bearing sleeve which carries the output end of the working shaft. A cover plate separates an inner space defined by the bell-shaped housing from an inner space defined by the shaft housing. The cover plate has a bore through which the output end of the shaft extends outwardly. A work performing element is secured to the output end of the shaft. A seal structure includes an elastic sealing part supported by the shaft housing and a circumferential sealing ring formed integrally with the elastic sealing part. The bearing sleeve is inserted into the elastic sealing part, and the elastic sealing part is arranged between an outer circumferential area of the cover plate and the bell-shaped housing. The elastic sealing part and the sealing ring operate to center the bearing sleeve elastically.

12 Claims, 3 Drawing Sheets

PROCESSING TOOL FOR USE WITH A KITCHEN APPLIANCE FOR MIXING OR COMMINUTING FOOD MATERIALS

This is a continuation of International Application PCT/EP95/03932, with an international filing date of Oct. 05, 1995, now abandoned.

BACKGROUND OF THE INVENTION

This invention relates to a processing tool for mixing or comminuting food materials.

A processing tool of this type for an electric kitchen appliance is known from EP-A2 0 529 287 (FIG. 4), which tool, in conjunction with a drive part (motor housing), is also referred to as an "immersion blender". This processing tool has an elongated tubular housing part in which a drive shaft is guided in a spaced relationship to the housing walls. This drive shaft is carried in bearings at its respective input and output ends, with the processing tool being adapted to be connected to the drive unit to form a hand-held or immersion blender.

Integrally formed with the lower end of the housing in the area of the output end of the shaft is a bell-shaped housing of such cross sectional dimension normal to the axis of the drive shaft as to enable a cutter blade to be accommodated there. The bell-shaped housing is sealed relative to the tubular housing part by means of a lid or a cover plate which on its side close to the tubular housing includes a holding means for a roller diaphragm forming a seal between the drive shaft and the tubular housing part. In the transition zone between the bell-shaped housing and the tubular housing part or shaft housing there is also a bearing sleeve carrying the working shaft at this end. The bearing sleeve is mounted by means of a further bearing part which, for example, may be a rubber bearing part that absorbs any radial vibrations of the working shaft in this particular area.

Since the processing tool, as known from the above mentioned EP-A2 0 529 287, is used in conjunction with a drive part to comminute, puree or blend food materials of the most diverse consistencies from solid and viscous to liquid, it is essential on the one hand for those parts in contact with the food materials to be cleanable with ease and, on the other hand, for the bell-shaped housing to be tightly sealed from the shaft housing, which is precisely the purpose of the above mentioned cover plate that closes off the entire cross section of the bell-shaped housing from the shaft housing.

A processing tool of the type described in EP-A2 0 529 287 has proven successful in use. The individual parts, such as the cover plate and the bearing parts, ensure in particular that the shaft is flexibly carried in the transition zone between the bell-shaped housing and the shaft housing, while at the same time the bearing is protected by the cover plate. If food residues are cleaned off the processing tool after each instance of use, it is imperative that the spaces in the interior of the processing tool and particularly the bearings become neither wet nor dirty.

SUMMARY OF THE INVENTION

It is accordingly an object of the present invention to further develop the processing tool of an immersion blender such that a reliable seal preventing the ingress of liquid is effected in the transition zone between the bell-shaped housing and the shaft housing, that the working shaft has its output end installed in anti-vibration mountings, and that any radial deflections are absorbed without the sealing properties being adversely affected. With this arrangement it is intended in particular to simplify the assembly effort and to reduce the costs of production.

For one purpose, the sealing part inserted carries the shaft in that it flexibly centers the bearing sleeve. For another purpose, it also comprises a sealing ring that seals the cover plate in the area of its circumference against the bell-shaped housing. This composite sealing part is thus the only means required to perform all the necessary sealing and bearing functions in the transition zone between the bell-shaped housing and the shaft housing. The spatially enlarged single-piece sealing part results in a strong but nevertheless elastic structure, which even with fewer components is easy to assemble and has an advantageous effect on series production in particular. There is no need for any difficult assembly of individual parts such as an elastic bearing and a separate O-ring, on the contrary, the sealing part can be removed from the housing as a complete component and reinserted following replacement, being held captured therein.

To obtain a stable connection between the sealing ring and that area of the sealing part which accommodates the bearing sleeve of the working shaft, the sealing part and the circumferential sealing ring are preferably joined together by means of a bell-shaped sealing element. At the same time, through its connection to the external sealing ring anchored between the cover plate and the bell-shaped housing, this bell-shaped sealing element also performs the function of taking up and directing to the outside the forces produced by radial deflections of the working shaft through a very large surface area.

The connecting bars are an advantage in that they are engageable in corresponding grooves in the shaft housing and/or the bell-shaped housing, thereby enabling the entire sealing part to be centered and mounted securely in the bell-shaped housing and the shaft housing.

When the cover plate is inserted and pressed into position after the seal is slipped over the working shaft and inserted in the shaft housing, the extension of the cover plate braces by simple means the sintered bearing carrying the working shaft against the inner circumference of the shaft housing, which extension is mounted in the tubular sections of the seal.

Support posts which serve as steps for the cover plate are provided in order to create an additional centering and bearing aid. A centered arrangement of the sealing element that is fixedly located in the circumferential direction is thus accomplished particularly in the area of the sealing element.

A circumferential O-ring seal is used preferably as the outer sealing element fitted between the cover plate and the bell-shaped housing, preferably an O-ring seal of the type including a circumferential groove on its side facing away from the cover plate so as to invest the seal with greater flexibility in a radial direction to the working shaft. To ensure that such an O-ring seal remains centered it is resident within a circumferential groove in the bell-shaped housing.

In a further embodiment of the processing tool, the sealing part of the seal holds the bearing sleeve centered in an axial direction of the shaft so that this bearing sleeve remains in the seal when the seal is removed from the processing tool for cleaning purposes, for example.

The sealing part includes axially extending bars on the outside of the sealing part in the area of the bearing sleeve which rest against the inside of the shaft housing. The sealing part is provided to obtain good centering of the bearing sleeve and hence of the working shaft in the shaft housing while lending the seal in this area sufficient elasticity to absorb any radial deflections of the working shaft. Hence in this arrangement cavities are formed between the individual radial bars of the sealing part, in the vicinity of which the bars are able to expand under the action of the working shaft's radial vibrations.

The seal is preferably a single-piece part made of a polyester elastomer that ensures sufficient, permanent elastic and sealing properties, while at the same time being unproblematic with regard to food.

Further details and features of the processing tool according to the present invention will become apparent from the subsequent description of an embodiment in the form of an immersion blender, reference being had to the accompanying drawings.

DETAILED DESCRIPTION

Figure 1:
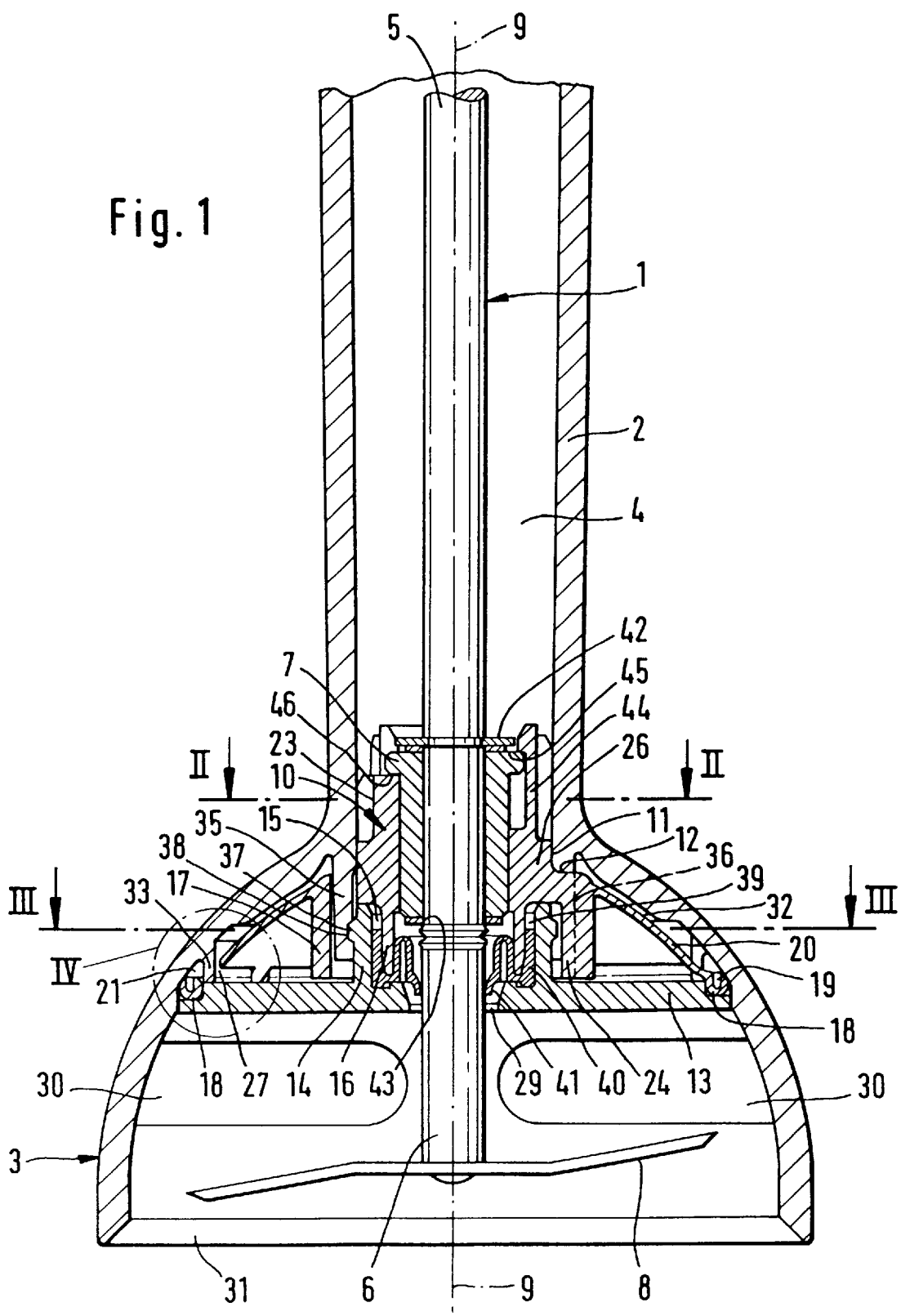
FIG. 1 is a longitudinal section of the processing tool in the area of the lower end of a shaft housing and an adjacent bell-shaped housing.

The processing tool as illustrated in the longitudinal section of FIG. 1 includes a working shaft 1 extending through a shaft housing 2 which continues in a bell-shaped housing 3 at the lower end thereof. The inner diameter of the shaft housing 2 is dimensioned to leave a free space 4 between the working shaft 1 and the inner circumference of the shaft housing 2.

The working shaft 1 has both its input end 5 and its output end 6 carried in a respective bearing sleeve (sintered bearing) 7 made of metal. The upper bearing at the input end 5 is not shown in the Figures. Further, the shaft housing 2 and the working shaft 1 at its input end 5 may be connected to a drive unit, thus forming a compact immersion blender of the type sold for years by the applicant.

A cutter blade 8 is bolted, caulked or in some other fashion directly fastened by positive engagement to the output end 6 of the working shaft 1 so that it is able to rotate with the working shaft 1 about the axis 9 inside the bell-shaped housing 3, the cutter blade 8 being encompassed protectively in a radial direction by the bell-shaped housing 3 which has horizontally extending slots 30 on its circumference. When food materials are being processed, they can be expelled through the slots 30 and drawn in again at the bottom through the opening 31 of the bell-shaped housing 3.

The bearing sleeve 7 is clampingly held in a bearing and/or sealing part 10 which with its upper section 26 takes support upon the end of the shaft housing 2 in the transition zone to the bell-shaped housing 3 in both a radial and an axial direction by means of an abutment surface 11 and a shoulder surface 12, respectively.

A cover plate 13 closes off the bell-shaped housing 3 in the middle of its extent but above the slots 30, looking in the direction of the axis 9. On its inner side, that is, on its side close to the shaft housing 2, the cover plate 13 has a tubular extension 14 reaching into a space 15 formed between an inner section 16 of the bearing part 10 and an outer tubular section 17 of the bearing part 10. The two sections 16, 17 extend concentrically with each other. On the outside of the extension 14 are protrusions 37 which lockingly engage into recesses 38 formed on the ends 35 in order to fasten the cover plate 13. Between the section 16 and the extension 14 is a further annular chamber 39 into which the end of a radial packing ring 40 is press-fitted, said packing ring being comprised of a roller diaphragm at whose other ends the sealing lip 41 is formed which rests against the output end 6 to effect a seal. The seal 10 thus serves as both a bearing part and a sealing part. The output end 6 of the shaft 1 extends through the cover plate 13 by passing through a bore 29.

Figure 4:
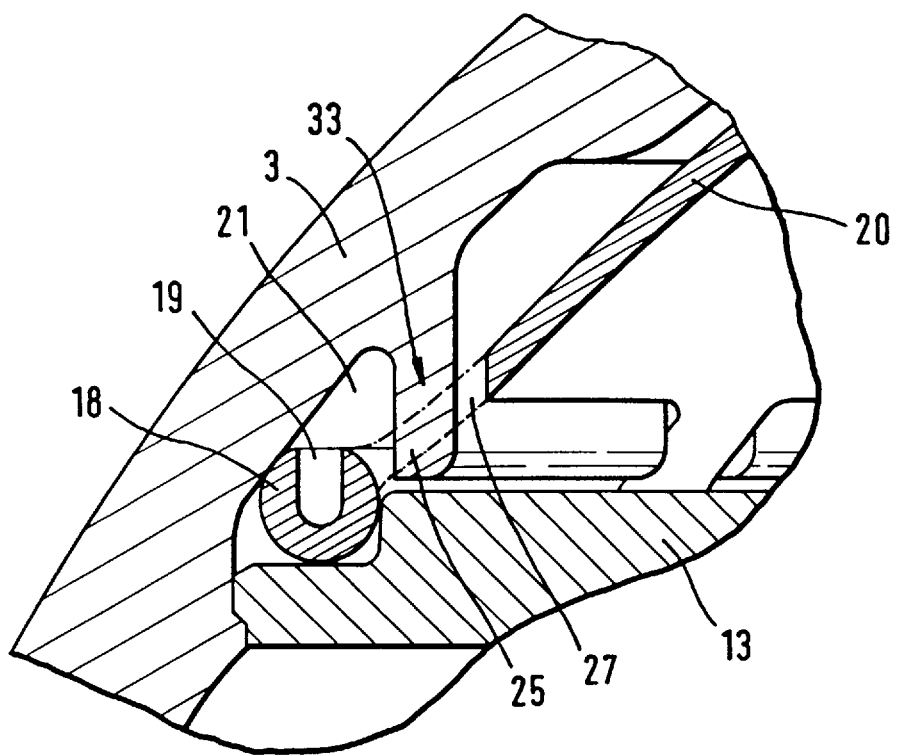
FIG. 4 is an enlargement of the detail identified by IV in FIG. 1.

Still further, an O-ring seal 18 is inserted between the outer circumference of the cover plate 13 and the bell-shaped housing 3. The arrangement between the cover plate 13 and the inner wall of the bell-shaped housing 3 is shown in FIG. 4 as an enlargement of detail IV of FIG. 1. This O-ring seal 18 has on its upper side, that is, on its side close to the shaft housing 2, a circumferential sealing groove 19 that enhances the elasticity of the O-ring seal 18 in a radial direction.

As becomes apparent from FIG. 1 and the detail illustration of FIG. 4, the circumferential O-ring seal 18 is connected via a bell-shaped sealing element 20 to the seal's bearing part 10 receiving the bearing sleeve 7 in such a way that the bearing and/or sealing part 10, the bell-shaped sealing element 20, the O-ring seal 18 and the tubular sections 16 and 17 of the cover plate 13 combine to form a single-piece seal and/or single-piece bearing structure 32, which not only carry the working shaft 1 and the bearing sleeve 7 but also seal off the bearing sleeve 7, the shaft housing 2, the bell-shaped housing 3 and the cover plate 13 from each other at various locations.

As FIG. 4 also makes clear, the O-ring seal 18 is press-fitted, upon insertion of the cover plate 13, into a circumferential groove 21 in the inner circumference of the bell-shaped housing, whereby on account of the circumferential sealing groove 19 it is deformed particularly in a radial direction but also in an axial direction, thus enabling it to position itself between the bell-shaped housing 3 and the cover plate 13, thereby effecting a seal. The space of the sealing groove 19 is reduced in the process, a fact that is however not visible in FIG. 4.

The bell-shaped section of the sealing element 20 between the O-ring seal 18 and the bearing and/or sealing part 10 results in an essentially continuous seal structure 32 from the outer circumference of the cover plate 13 to the bearing sleeve 7 supporting the working shaft 1, interrupted only by support posts 33 reaching down through slots 27 from the circumference of the bell-shaped housing 3. The support posts 33 serve as stops for the cover plate 13 during automatic assembly (FIG. 4).

In FIG. 1 the bearing sleeve 7 is axially secured in place on the working shaft 1 by two circlips 42, 43. On its circumference the upper section 26 has uniformly spaced apart hooks 44 engaging the end 45 of the bearing sleeve 7 in order to join together the part 10 and the bearing sleeve 7 in a fixed axial connection. As a result, the ends of the bars 23 abut the end surface 46 of the bearing sleeve 7. Grooves 47 are formed on the outer circumference of the hooks 44 to enable an elastic mounting of the part 10 and hence of the bearing sleeve 7 in a radial direction inside the shaft housing.

Figure 2:
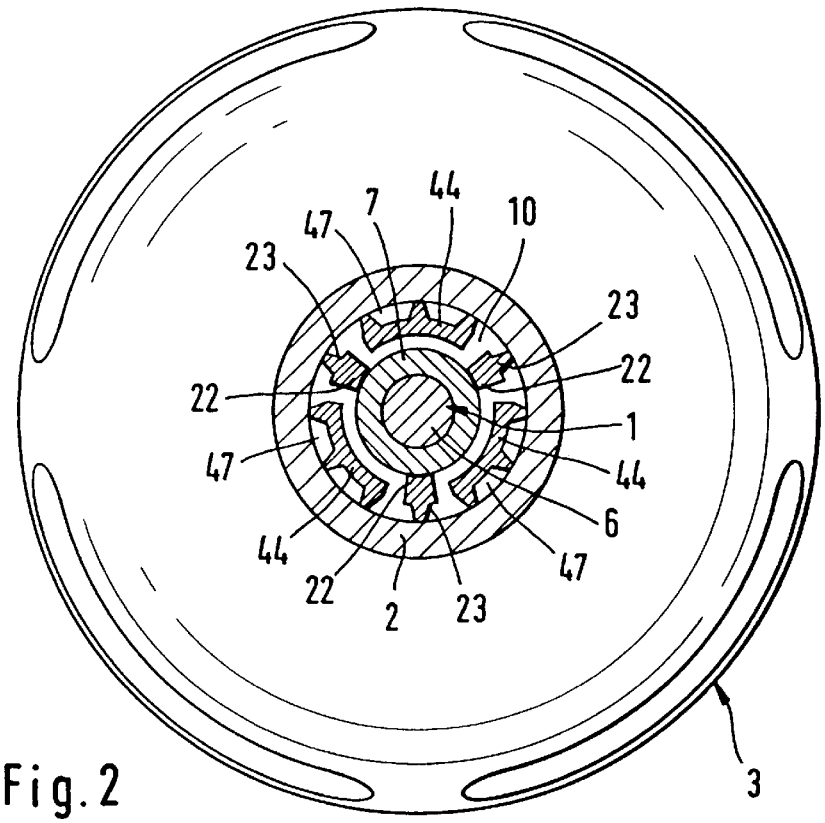
FIG. 2 is a section taken along the line II—II of FIG. 1.

As is clear from FIG. 2 which shows a section taken along the line II—II of FIG. 1 in the area of the end of the shaft housing 2 through the bearing sleeve 7, the bearing sleeve 7 is held full-surface in the lower area of the sealing part 10, whereas in the upper area it is in engagement with radially inwardly extending bars 22. On the outside of the sealing part 10 there are also axially extending bars 23, likewise uniformly spaced around the circumference, which rest against the inner wall of the shaft housing 2.

Figure 3:
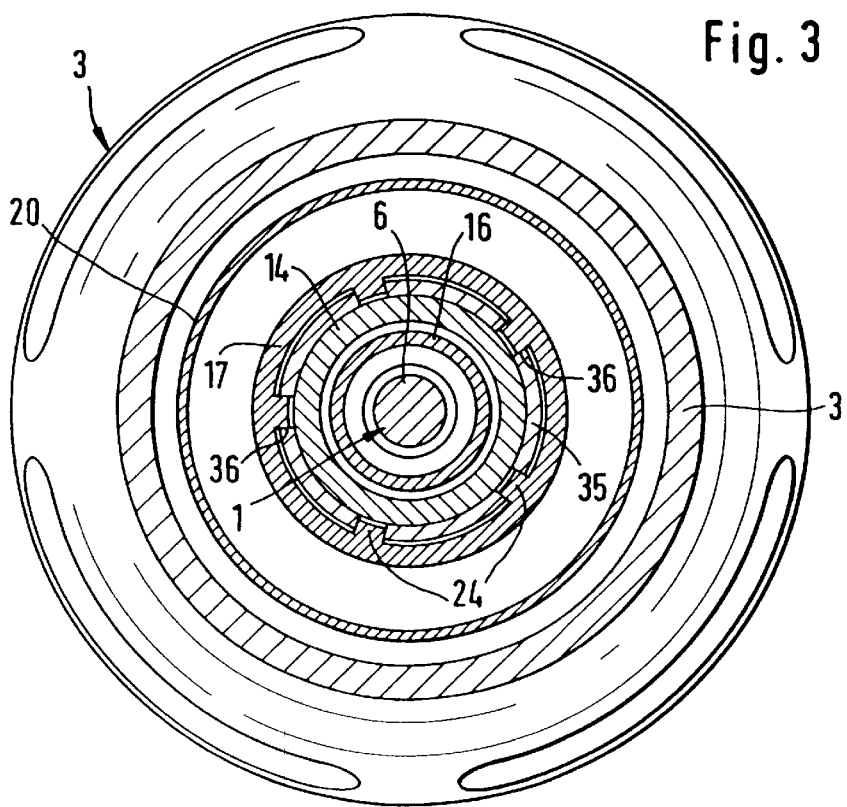
FIG. 3 is a section taken along the line III—III of FIG. 1.

As the sectional view of FIG. 3 shows, the tubular extension 14 of the cover plate 13 is equally guided by bars 24 provided on the outer tubular section 17 of the sealing part 10. This configuration of the individual parts including the bars 22, 23 and 24, but particularly the bars 24 on the outer tubular section 17, invests the arrangement with great elasticity and flexibility, in particular in order to be able to fasten and remove again the cover plate 13 with its tubular extension 14. Us FIG. 1 shows, the individual nested tubular parts of the seal are braced in such a way as to create a good, dampened mounting of the bearing sleeve 7 and the drive shaft 1.

As appears clearly from the sectional views of FIGS. 1 and 3, the end 35 of the shaft housing 2 reaching into the bell-shaped housing 3 is slotted in an axial direction, with these slots 36, preferably four to six, being engaged by the bars 24 of the section 17 which connect the bearing and/or sealing part 10 to the end 35 of the shaft housing 2 in a rotating relationship, as becomes apparent from the difference in presentation of the left- and right-hand half of FIG. 1 in the area of the end of the shaft housing 2.

What is claimed is:

1. A processing tool for mixing or comminuting food materials comprising:

a working shaft having an input end and an output end;

a shaft housing which carries the input end and is adapted for coupling to a drive motor of a kitchen appliance;

a flared bell-shaped housing attached to the shaft housing and positioned near the output end of the working shaft;

a bearing sleeve carrying the output end of the working shaft;

a cover plate separating an inner space defined by the bell-shaped housing from an inner space defined by the shaft housing, the cover plate having a bore through which the output end of the shaft extends outwardly;

a work performing element secured to the output end; and a seal structure having an elastic sealing part supported by the shaft housing, and a circumferential sealing ring formed integrally with the elastic sealing part, wherein the bearing sleeve is inserted into the elastic sealing part, and the circumferential sealing ring is arranged between an outer circumferential area of the cover plate and the bell-shaped housing, with the elastic sealing part and the sealing ring of the seal structure operating to center the bearing sleeve elastically.

2. The processing tool as claimed in claim 1, wherein the elastic sealing part and the circumferential sealing ring of the seal structure are joined together by a bell-shaped sealing element.

3. The processing tool as claimed in claim 2, wherein a first plurality of slots is formed in the bell-shaped sealing element.

4. The processing tool as claimed in claim 3, wherein an end of the shaft housing engages a second plurality of slots, and support posts engage the first plurality of slots.

5. The processing tool as claimed in claim 4, wherein the support posts serve as stops for the cover plate.

6. The processing tool as claimed in claim 1, wherein on the inside of the cover plate a tubular extension engages within a space between a pair of tubular sections of the seal structure.

7. The processing tool as claimed in claim 1, wherein the circumferential sealing ring is an O-ring seal.

8. The processing tool as claimed in claim 7, wherein the O-ring seal includes a circumferential sealing groove on the side of the O-ring facing away from the cover plate.

9. The processing tool as claimed in claim 7 or 8, wherein the O-ring seal is resident within a circumferential groove of the bell-shaped housing.

10. The processing tool as claimed in claim 1, wherein the sealing part clampingly holds the bearing sleeve centered in an axial direction of the shaft.

11. The processing tool as claimed in claim 1, wherein the sealing part includes on the outside of the sealing part in the area of the bearing sleeve axially extending bars resting against the inside of the shaft housing.

12. The processing tool as claimed in claim 1, wherein the seal structure is made of a polyester elastomer.

* * * * *